United States Patent [19]

Wilson

[11] 4,182,519
[45] Jan. 8, 1980

[54] RESILIENT SEALING RING

[76] Inventor: Ralph Wilson, 20 Keats St., Sunnybank, Queensland 4109, Australia

[21] Appl. No.: 927,293

[22] Filed: Jul. 24, 1978

[30] Foreign Application Priority Data

Jan. 24, 1978 [AU] Australia .............................. PD3123

[51] Int. Cl.² ........................ F16L 17/02; F16J 15/10
[52] U.S. Cl. ................................ 277/207 A; 285/110; 285/230; 285/231; 285/345; 285/369
[58] Field of Search ............... 277/207 A, 165, 207 R, 277/208; 285/110, 230, 231, 345, 369, DIG. 11

[56] References Cited

U.S. PATENT DOCUMENTS

| 2,565,923 | 8/1951 | Hrdlicka | 285/110 X |
|---|---|---|---|
| 2,914,345 | 11/1959 | Osborn | 285/110 |
| 3,135,519 | 6/1964 | Ligon et al. | 285/231 X |
| 3,684,317 | 8/1972 | Kazienko et al. | 285/345 X |

FOREIGN PATENT DOCUMENTS

| 564484 | 2/1958 | Belgium | 285/230 |
|---|---|---|---|
| 654454 | 2/1965 | Belgium | 277/207 A |
| Ad.70704 | 1/1959 | France | 285/110 |

*Primary Examiner*—Robert S. Ward, Jr.
*Attorney, Agent, or Firm*—J. Harold Nissen

[57] ABSTRACT

An improved sealing ring for forming socket-type pipe joints. The ring according to the present invention has an elongate cross-section having a bulbous leading end portion and a trailing end portion having a pair of fins extending towards the respective sealing surfaces.

The sealing ring provides a seal which is effective to seal a joint against internal and infiltration pressures.

14 Claims, 6 Drawing Figures

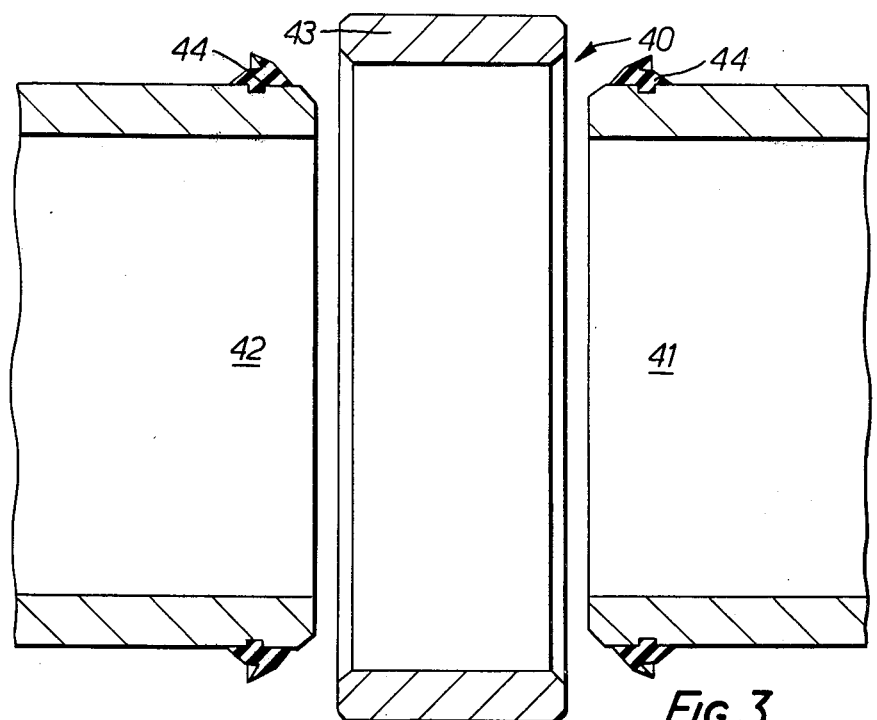
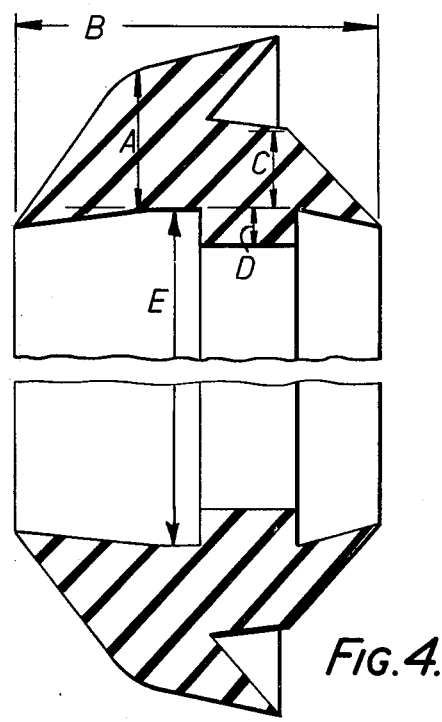
FIG.3.
FIG.4.

RESILIENT SEALING RING

This invention relates to pipe connection means and in particular it relates to an improved form of resilient sealing ring for sealing socketed pipe joints.

At present there are various ways of sealably joining pipes and the methods used vary according to the type of pipes used. Earthenware or vitrified clay pipes are commonly formed with one socket end and one plain end and such pipes are adapted to be joined sealably together by interposing a circular cross-section O-ring between the plain end of one pipe and the socket end of an adjoining pipe and forcing the ends into engagement. The engagement is accomplished by relative movement between the pipe ends to cause the O-ring to do one complete roll so that it assumes a compressed attitude between the socket end and the plain end of the pipes.

The collar length must be sufficient to enable the O-ring to complete the full roll to its engaged position and the O-ring must be accurately placed prior to forcing the ends together to ensure that the ring does not twist and form an ineffective seal. When the joint has been made it is normally necessary to check that the O-ring is accurately disposed in its operative position. The engagement action is accompanied by compressing of the O-ring and often the compression forces are sufficient to break the relatively long collar of the socket end of the pipe so that the joint and the pipe section are ruined.

Such fractures sometimes occur immediately upon installation or after some time has elapsed. If the failure occurs immediately, then the pipe has to be replaced and the inconvenience caused is minimal. However, it often happens that a pipe which is adjacent the head of a line of joined pipes fails due to the abovementioned compression forces after a period of time has elapsed. In such cases the whole pipeline assembly has to be dismantled to replace the fractured pipe. This problem is particularly troublesome in an underground installation as the pipeline has to be dug up to find the broken section to be replaced.

Accordingly, it is an object of this invention to provide an improved sealing ring for socket-type pipe joints which will overcome the abovementioned disadvantages of the presently available seals and which will be reliable and efficient in use.

Underground pipelines are often subject to external water pressure from the surrounding earth which is greater than the pressure within the pipe. The present invention enables a seal to be formed between pipes which will prevent ingress of fluid into the interior of the pipe from outside. Furthermore, the present invention aims to provide a sliding joint as opposed to a rolling joint whereby the seal can be used in wet and damp trench conditions without detriment to the standard of the finished joint. It is also desirable to prevent roots penetrating past seals into the pipelines and the present invention provides a seal which will be effective in preventing the penetration of roots past the seal into the interior of the joined pipes. Other objects and advantages of the invention will become apparent from the following description.

According to one aspect, the present invention resides broadly in a seal for a socket type pipe joint formed between the spigot end of the pipe and the socket end of an adjoining pipe, said seal being in the form of a resilient sealing ring adapted to be located at the end of one said pipe and slid into operative engagement with the other said pipe at which said sealing ring is located between the spaced outer surface of the spigot end of one pipe and the inner surface of the socket end of the overlapping pipe, said ring including a locating portion adjacent its operative leading end and having a transverse dimension sufficient to operatively position and maintain said socket end and said spigot end in their operative substantially concentric relationship, and said ring tapering from said locating portion towards said leading end and at the trailing end of said ring a pair of diverging annular fins each adapted to diverge towards a respective one of said inner surface of said socket end or outer surface of said spigot end, and said ring having an abutment portion extending therearound and adapted to be engaged behind a shoulder of said one pipe to fixedly locate said ring with respect to said one pipe.

In order that the invention may be more readily understood and put into practical effect, reference will now be made to the accompanying drawings which illustrate preferred embodiments of the invention and wherein:

FIG. 3 illustrates an alternate form of joint made in accordance with the present invention;

FIG. 4 is an enlarged cross-sectional view of a the sealing ring of FIG. 1 and dimensioned to illustrate relative proportions;

Figure 1:
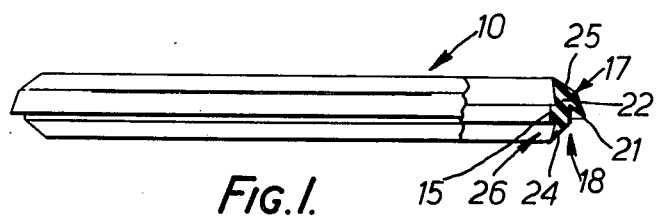
FIG. 1 illustrates a resilient sealing ring according to the present invention, partly cut away to illustrate the cross-sectional configuration of the ring.
Figure 2:
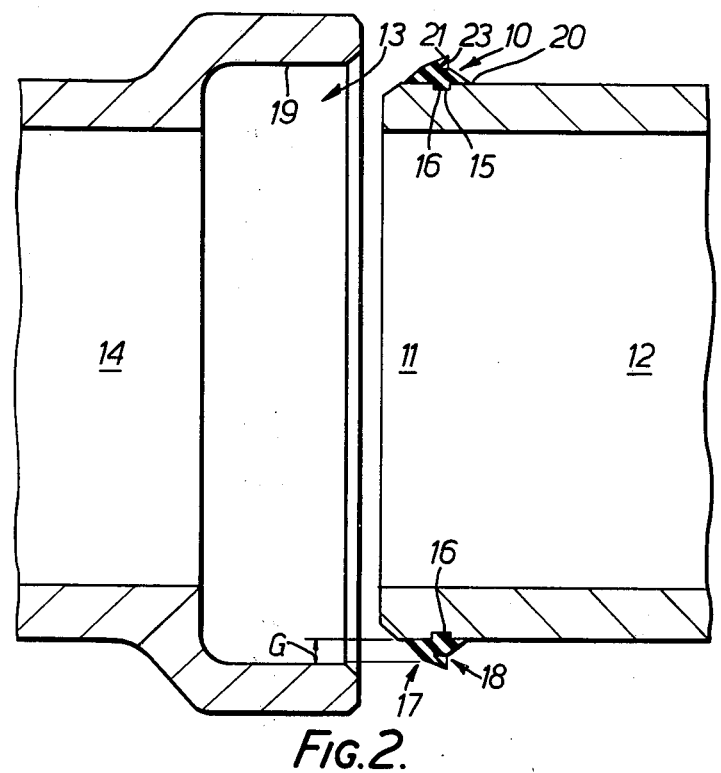
FIG. 2 is a cross-sectional view illustrating the ring operably supported on the end of a pipe and arranged for connection to the spigot end of adjoining pipes.

The sealing ring 10 of the embodiment illustrated in FIGS. 1 to 4 is adapted to be located about the plain end of a pipe 12 for sliding engagement within the socket end 13 of an adjoining pipe 14. The ring 10 has an abutment portion 15 around its inside surface which is adapted to be engaged within a corresponding groove 16 in the plain end 11 of the pipe 12. The engagement of the abutment portion 15 within the groove 16 positively locates the sealing ring about the plain end 11. The sealing ring 10 supported about the plain end is forced slidably into engagement within the lubricated socket end 13 of the adjoining pipe, accompanied by compression of the sealing ring 10.

As shown, the leading portion 17 of the sealing ring 10 is chunky while the trailing portion 18 of the ring is provided with oppositely directed fins which, in this embodiment, diverge rearwardly towards a respective one of an inner face 19 of the socket end 13 and the outer face 20 of the plain end 11. As the sealing ring is compressed by sliding engagement into the socket end 13 the chunky portion is compressed inwardly and the outwardly diverging fin 21 is maintained in sealing contact with the inner face 19 and is deformed so that the gap separating the fin 21 from the body portion 22 of the ring is reduced. However, the back face 23 of the fin 21 is still in communication with the medium exteriorally of the joint so that if the pipe is buried underground in a wet location the external water pressure will force the fin 21 into sealing engagement with the inner surface 19 and the inner fin 24 into sealing engagement with the surface 20 of the plain end of the pipe 12. Of course, sealing pressure is increased with increase in outside pressure. Thus, the rearward diverging face ensures that an effective seal is maintained against infiltration by the medium exteriorly of the seal.

The leading chunky portion 17 has a thickness dimension A in its uncompressed attitude about thirty percent greater than the gap G between the outer surface 20 and the inner surface 19 of the respective plain end and socket end of adjoining pipes. Suitably the ring is made of a resilient material having a density reckoned by the Shaw scale of about 48 to 52 units so that when the chunky portion 17 of the ring is compressed between the plain end 12 and the socket end 13 an effective seal is made between the pipes to prevent egress of fluid from the pipe joint. The compression of the chunky portion 17 affords a sealing effect similar to the sealing effect provided by a conventional circular cross-sectioned O-ring.

The leading outer surface 25 of the ring 10 slopes rearwardly to assist in the compression of the chunky portion of the ring 17 by ramp action as the ring, supported about the plain end 12, is slid into the socket end 13 of the adjoining pipe. Furthermore, it will be seen that the trailing end portion 26 continues a relatively large thickness rearwardly to the junction with the outer fin 21. This is provided to give the ring a support stiffness from the trailing portion of the ring to prevent the leading chunky portion being twisted back upon itself as it is compressed into the socket end 13 of the adjoining pipe.

The inner fin 24 extends from the trailing end portion 26 which comprises a continuation of the chunky leading end 17 maintained at a dimension C approximately equal to or greater than sixty percent of the gap G. Preferably, the transverse thickness D of the inwardly extending abutment portion 15 is about forty percent of the dimension G. These proportions are nominated for the ring in its free attitude and of course the ring has to be stretched so as to fit tightly about the plain end 12. Suitably the dimension E—the effective internal diameter of the ring—is less than the outer diameter of the plain end 12 by about ten to fifteen percent. Conventionally, the gap dimensions between the plain end and the spigot end of adjoining pipes varies according to the type of ring used, but a gap between the plain end and the spigot end of pipes in the range of up to 150 millimeters diameter is usually approximately nine millimeters. This gap is commonly increased to eleven millimeters in pipes beyond this dimension and up to six hundred millimeters. These gaps are suitable for the ring according to the present invention, but they may be decreased if desired to enable a more economical pipe socket to be formed. If desired a joint may be formed as illustrated in FIG. 3, utilising two seals and a separate collar. The dimension B is preferably about three times dimension A.

Figure 5:
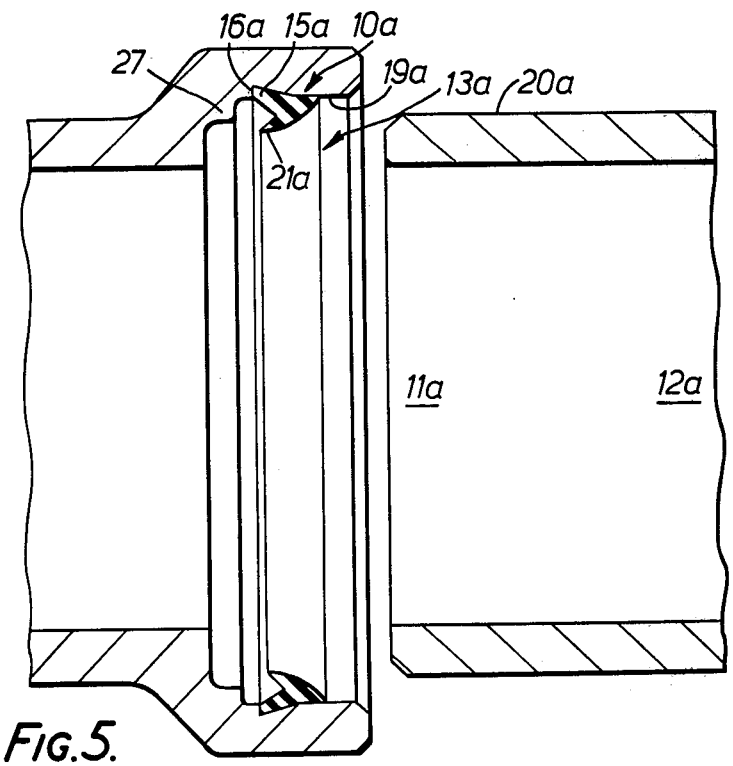
FIG. 5 is a cross-sectional view of an alternate embodiment of sealing ring according to the present invention showing its operative relationship with respect to the plain end and the spigot end of adjoining pipes.

FIG. 5 illustrates an alternate embodiment of sealing ring 10a according to the present invention adapted for an installation in which the internal pressure within the pipelines will far exceed the external pressure applied to the seal. In this case, the abutment portion 15a is adapted to fit within a recess or groove 16a in the inner face 19a of the socket end of the pipe and the fin 21a diverges towards the interior of the pipe. Of course, the cross-sectional configuration of the seal illustrated in FIG. 5 could be varied to concur with the cross-sectional configuration of the rings illustrated in FIG. 1, but, of course, the abutment portion 15 would be disposed at the exterior of the ring while the fin 21 would be disposed on the interior of the ring.

At present, in conventional O-ring joints, after many years underground, the pipes can move eccentrically so that the seal is not effective around the full periphery of the joint. This is because the seal supports the weight of the inner pipe. Thus, in large heavy pipes larger cross-sectioned seals are used. The present invention provides in the socket end 13a a shoulder 27 inwardly of the ring 10a adapted to loosely house the inner end 11a of the pipe 12a. The clearance between the shoulder 27 and the outer surface 20a is sufficient to enable the pipes to centralise themselves through the medium of the seal 10a, but it is not sufficient to enable the pipes to move out of concentric alignment to an extent where the resilient ring 10a does not make an effective seal therebetween. Accordingly, relatively small cross-sectioned seals can be utilised with a consequent cost saving as the seal performs only a sealing function and not a weight carrying function.

Figure 6:
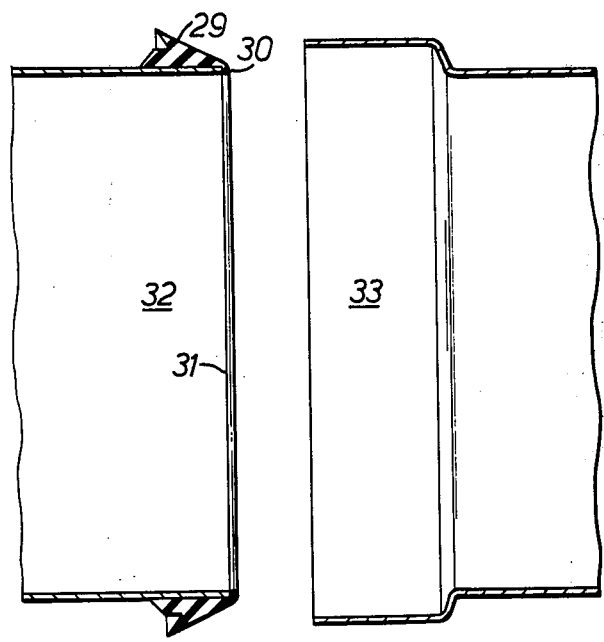
FIG. 6 is a typical cross-sectional view of another embodiment of the invention.

FIG. 6 illustrates a further embodiment of the invention, particularly adapted for forming a seal between a socket type joint between the ends of plastic pipe. The seal 29 in this embodiment is similar to the previously described seals except that the locating portion 30 is disposed at the leading edge of the seal and is adapted to pass about the end 31 of the spigot end 32 of the pipe. This locating portion 30 will maintain the seal 29 in its operative position on the spigot end of the pipe as it is slid into engagement in the socket end 33 of the adjoining pipe.

If desired, a loose collar joint 40 may be used for connecting together the spigot ends of pipes 41 and 42, as shown in FIG. 3. In this form the loose collar 43 is adapted to be engaged about the respective ends of pipes to be joined, each being fitted with a seal 44 according to the present invention.

Tests have shown very favourable results for the present invention. For example, a pipe line laid from randomly selected earthenware pipes fitted with the recommended O-ring seals failed at seventeen pounds per square inch. The line was then taken up and each spigot end grooved to accept the ring illustrated in FIG. 1. The line was reassembled with the same pipes and tested, up to a test pressure of 45 pounds per square inch without failure. Of course, this is far in excess of the required test pressure.

While the seal will stand a very high internal pressure its ability to withstand infiltration pressures is even greater, and this enables the sealing ring of the present invention to be used very effectively in underground locations where the exterior pressure is far in excess of the interior pressure.

As the joint is formed with a lubricant and can be affected in wet conditions, dewatering apparatus commonly utilised to keep trenches dry for the fitting of O-ring seals is not required.

It will of course be realised that while the above has been given by way of illustrative example many modifications of constructional detail and design can be made to the above-described embodiments by persons skilled in the art without departing from the broad scope and ambit of the invention as is defined in the appended claims.

I claim:

1. A seal for a socket type pipe joint formed between the spigot end of a pipe and the socket end of an adjoining pipe, said seal being in the form of a resilient sealing ring adapted to be located at the end of one said pipe and slid into operative engagement with the other said pipe for location between the spaced outer surface of the spigot end of one pipe and the inner surface of the socket end of the overlapping pipe, said ring including a locating portion adjacent its operative leading end having a transverse or radial dimension sufficient to operatively position said socket end and said spigot end in their operative substantially concentric relationship, and said ring tapering from said locating portion towards said leading end and at the trailing end of said ring a pair of diverging annular fins each adapted to diverge towards a respective one of said inner surface of said socket end or said outer surface of said spigot end, and said ring having an abutment portion extending therearound and adapted to be engaged behind a shoulder of said one pipe to fixedly locate said ring with respect to said one pipe.

2. A seal according to claim 1, wherein said leading end tapers towards said one pipe.

3. A seal according to claim 2, wherein said transverse or radial dimension of said locating portion is substantially thirty percent greater than the gap between the respective inner and outer surfaces of the concentrically disposed socket end and spigot end of said pipes.

4. A seal according to claim 3, wherein said abutment portion is disposed rearwardly of said locating portion and said trailing fin which tapers towards said one pipe extends from a continuation of a substantial proportion of said locating portion which extends past said abutment portion.

5. A seal according to claim 4, wherein the transverse or radial dimension of said continuation of substantial portion of said locating portion is substantially equal to or greater than sixty percent of the radial dimension of the gap between the respective inner and outer surfaces of the concentrically disposed socket end and spigot end of said pipes.

6. A seal according to claim 3, wherein said abutment portion comprises an annular projection having a substantially rectangular cross-section.

7. A seal according to claim 6, wherein the transverse or radial dimension of said annular projection is substantially equal to or greater than forty percent of the gap between the respective inner and outer surfaces of the concentrically disposed socket end and spigot end of said pipes.

8. A seal according to claim 3, wherein the effective internal diameter of said seal is less than the outer diameter of said spigot end by about ten to fifteen percent.

9. A seal according to claim 8, wherein the overall length of said seal from its leading end to its trailing end is approximately three times the transverse or radial dimension of said locating portion.

10. A seal for a socket type pipe joint formed between the spigot end of a pipe and the socket end of an adjoining pipe, said seal being in the form of a resilient sealing ring adapted to be located about said spigot end and slid into operative engagement within said socket end of the adjoining pipe for location, said ring including a locating portion adjacent its operative leading end having a transverse or radial dimension sufficient to operatively position said socket end and said spigot end in their operative substantially concentric relationship, and said ring tapering away from the inner face of said socket end towards said leading end and at the trailing end of said ring a pair of diverging annular fins each adapted to diverge towards a respective one of said inner surface of said socket end or the outer surface of said spigot end, and said ring having an abutment portion extending therearound and adapted to be engaged within a recess in said spigot end to fixedly locate said ring thereabout.

11. A seal according to claim 10, wherein said transverse or radial dimension of said locating portion is substantially thirty percent greater than the gap between the respective inner and outer surfaces of the concentrically disposed socket end and spigot end of said pipes.

12. A seal according to claim 11, wherein said abutment portion is disposed rearwardly of said locating portion and said trailing fin which tapers towards said one pipe extends from a continuation of a substantial proportion of said locating portion which extends past said abutment portion and the radial dimension of said continuation of substantial portion of said locating portion is substantially equal to or greater than sixty percent of the radial dimension of the gap between the respective inner and outer surfaces of the concentrically disposed socket end and spigot end of said pipes.

13. A seal according to any one of the preceding claims, wherein said abutment portion comprises an annular projection having a substantially rectangular cross-section and the radial dimension of said annular projection is substantially equal to or greater than forty percent of the gap between the respective inner and outer surfaces of the concentrically disposed socket end and spigot end of said pipes.

14. A seal according to claim 13, wherein the effective internal diameter of said seal is less than the outer diameter of said spigot end by about ten to fifteen percent.

* * * * *